(12) United States Patent
Lange et al.

(10) Patent No.: US 6,180,434 B1
(45) Date of Patent: Jan. 30, 2001

(54) METHOD FOR PRODUCING A CONTACTLESS CHIP CARD

(75) Inventors: Martin Lange; Ghassem Azdasht, both of Berlin (DE)

(73) Assignees: Elke Zakel, Falkensee (DE); Smart Pac GmbH Technology Services, Nauen (DE)

( * ) Notice: Under 35 U.S.C. 154(b), the term of this patent shall be extended for 0 days.

(21) Appl. No.: 09/284,361

(22) PCT Filed: Oct. 13, 1997

(86) PCT No.: PCT/EP97/05624

§ 371 Date: Apr. 13, 1999

§ 102(e) Date: Apr. 13, 1999

(87) PCT Pub. No.: WO98/16901

PCT Pub. Date: Apr. 23, 1998

(30) Foreign Application Priority Data

Oct. 14, 1996 (DE) .............................................. 196 42 378

(51) Int. Cl.[7] .................................................. H01L 21/44
(52) U.S. Cl. ............................................ 438/106; 438/108
(58) Field of Search ..................................... 438/106, 108

(56) References Cited

U.S. PATENT DOCUMENTS

| | | | | |
|---|---|---|---|---|
| 5,886,926 | * | 3/1999 | Marquot | 365/185.21 |
| 5,929,416 | * | 7/1999 | Dos Santos Pato et al. | 235/439 |
| 5,969,415 | * | 10/1999 | Pranez | 438/106 |
| 5,978,262 | * | 11/1999 | Marquot et al. | 365/185.01 |
| 5,998,978 | * | 12/1999 | Connell et al. | 323/273 |
| 6,031,278 | * | 2/2000 | Onoda et al. | 438/106 |
| 6,048,750 | * | 4/2000 | Hembree | 438/108 |
| 6,074,893 | * | 6/2000 | Nakata et al. | 438/106 |
| 6,093,584 | * | 7/2000 | Fjelstad | 438/108 |

\* cited by examiner

*Primary Examiner*—John F. Niebling
*Assistant Examiner*—Lynne A. Gurley
(74) *Attorney, Agent, or Firm*—Michael A. Glenn

(57) ABSTRACT

A method of producing a contactless chip card (10) includes first the step of holding a chip (14), which is provided with terminal pads (16*a*, 16*b*) on a surface thereof, in a mould defining a chip-card substrate (12), in such a way that the chip surface provided with the terminal pads is located substantially in the same plane as a chip-card substrate surface defined by the mould. In addition, a chip-card substrate material is introduced into the mould, whereupon a coil structure (18) is applied by screen-printing a conductive paste onto the chip-card substrate (12) in such a way that the coil structure (18) extends up to the terminal pads (16*a*, 16*b*) on the chip.

2 Claims, 2 Drawing Sheets

METHOD FOR PRODUCING A CONTACTLESS CHIP CARD

FIELD OF THE INVENTION

The present invention refers to a method of producing a contactless chip card which is supplied with energy and which communicates by means of electromagnetic waves.

1. Description of Background Art

Lately, it has become much more common to use contactless chip cards e.g. as car keys or as door keys. Such contactless chip cards permit a fast and contact-free opening of doors or also a fast identification of a specific person.

Contactless chip cards normally comprise on a chip-card substrate a microchip and an antenna structure. Normally, the chip card is not provided with an internal power supply so as to prevent the chip card from becoming ineffective when the battery has run down. The chip card is supplied with electric power in the form of electromagnetic waves from a base station, this being one reason for the fact that induction antennae or coil antennae are normally used for chip cards. In contrast to dipole antennae, loop antennae permit a more effective coupling in of electromagnetic power in the antenna on the chip. This power coupled into the antenna is rectified for supplying the microchip, which is provided on the chip card as well, with electric power so that said microchip can transmit a special code e.g. to the door lock of a car or to an identification means so as to accomplish an act coded by said code.

The operating principles of coupling electric power into the chip card and of communication between the microchip and a stationary or mobile station are known to those skilled in the art and described e.g. in U.S. Pat. No. 5,473,323. This patent describes a method for contactless data and power transmission between a stationary microstation comprising a pair of coils and a means for providing an oscillating clock signal and a mobile microunit comprising one or two coils.

In addition, U.S. Pat. No. 5,449,894 describes a method for operating a contactless chip card which is not provided with a battery and which is supplied with power via a power-transmitting alternating field from a write/read unit. The bidirectional data transmission is accomplished by modulation of the power-transmitting alternating field by means of an antenna coil, said power-transmitting field producing a coil current in the coil and a coil voltage at the coil; an input circuit is coupled to ends of the coil for generating a supply voltage from the current in the coil and a voltage detector is coupled to the ends of the coil for detecting specific properties of the power-transmitting alternating field.

U.S. Pat. No. 5,440,302 describes a device for contactless data and power transmission, which comprises a stationary part and a mobile part.

2. Description of Prior Art

For producing contactless chip cards, an insulating chip-card substrate is normally used on which a microchip that is capable of carrying out the desired functions is placed. At a point of the chip-card substrate which is remote from the microchip or on a separate substrate, the necessary antenna structures, which are substantially implemented as coils, are additionally applied e.g. by means of known photolithographic techniques. For connecting the coil structures to the microchip, bonding wires can be used in the case of known contactless chip cards. The bonding wires extend from a connection point of a coil to a connection point on the microchip, said bonding wires being produced in the manner known by means of a bonding device so as to interconnect the coil structure and the microchip in an electrically conductive manner.

This method of producing known contactless chip cards is disadvantageous insofar as expensive bonding devices are required for connecting the microchip to the antenna structure. In the case of a mass product, and a contactless chip card is such a mass product beyond all doubt, even small cost advantages of the product decide whether said product will gain acceptance in comparison with a more expensive competing product.

EP 0756244 A2, which has been published after the priority date of the present application, discloses a circuit module and a method of producing a circuit module. For embedding an integrated circuit into a supporting substrate, a suitable recess can either be provided or the integrated circuit can be pressed into the supporting substrate by applying heat and pressure.

DE 4416697 A1 discloses a data carrier provided with an integrated circuit. The integrated circuit is connected to at least one coil via contact elements, said integrated circuit and said contact elements forming a module and the coil being arranged on a card body. The coil is arranged on an inner layer of the card body, said inner layer being also provided with an opening for receiving the module therein. The module, which comprises at least one integrated circuit with two connections, is introduced in a previously produced recess of the inner layer.

DE 4431606 A1 discloses a chip-card module for a contactless chip card and a method of producing the same. A semiconductor chip is arranged on a flexible, non-conductive supporting chip, two ends of an enamelled-wire coil being electrically connected to the semiconductor chip so as to establish a direct connection between said semiconductor chip and the coil ends. The chip is placed on the carrier body and is then contacted.

DE 44 10 732 A1 discloses both a method of producing a chip card and a chip card. The chip card comprises a chip and a coil, said chip and said coil being arranged on a common substrate and the coil being formed by laying a coil wire. The chip is incorporated into the surface of the substrate by thermocompression, i.e. by making the surface of the substrate soft by means of heat and by pressing the chip into said surface, or by "rubbing in" by means of ultrasonic action.

SUMMARY OF THE INVENTION

It is the object of the present invention to provide an economy-priced and reliable method of producing a contactless chip card.

This object is achieved by a method of producing a contactless chip card, comprising the steps of: holding a chip, which is provided with terminal pads on a surface thereof, in a mould defining a chip-card substrate, in such a way that the chip surface provided with said terminal pads is located substantially in the same plane as a chip-card substrate surface defined by the mould; introducing a chip-card substrate material into the mould; and applying a coil structure by screen-printing a conductive paste onto the chip-card substrate in such a way that the coil structure extends up to the terminal pads on the chip.

The present invention is based on the finding that the connection of the coil structure to the microchip, which has to be carried out in a separate step, can be dispensed with, when a coil structure as well as a chip are arranged on a common insulating chip-card substrate. By realizing the coil structure by the application of a conductive paste, after arranging the chip on the chip-card substrate, in such a way that the coil structure extends up to the terminal pads on the chip, it is no longer necessary to carry out a separate bonding step, since the coil structure is already connected to the chip.

BRIEF DESCRIPTION OF THE DRAWINGS

In the following, a preferred embodiment of the present invention will be explained in detail making reference to the drawings enclosed, in which.

DETAILED DESCRIPTION OF THE PRESENT INVENTION

Figure 1:
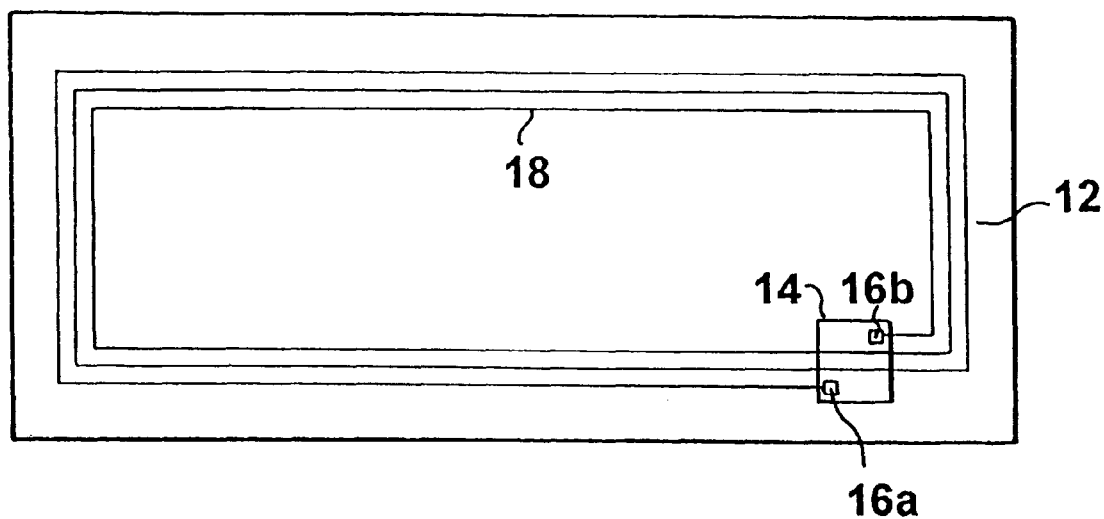
FIG. 1 shows a top view of a contactless chip card which has been produced by the method according to the present invention.

FIG. 1 shows a schematic top view of a contactless chip card 10 which has been produced by the method according to the present invention. The contactless chip card 10 comprises an insulating chip-card substrate 12 having arranged therein a chip 14 which is provided with two terminal pads 16a and 16b. The terminal pads 16a and 16b, respectively, have connected thereto the ends of a conductive coil structure 18 having three turns in the case of the embodiment shown in FIG. 1. The surface of the microchip 14 is normally implemented as an insulating surface with the exception of the terminal pads 16a, 16b. The conductor sections of the coil structure 18 extending over the chip are therefore insulated from said chip.

FIG. 2A to 2D show a cross-sectional view of the contactless chip card 10 in a sequence of production steps for said chip card. In a mould having a recess defining the shape of the chip-card substrate, the chip 14 is held in the manner known. In the next step, the chip is fixedly placed in the chip-card substrate 12 by casting a material suitable for the chip-card substrate 12 into the substrate mould and by curing said material. Subsequently, an electrically conductive paste 22 is applied by means of a mask to the chip-card substrate in which the chip 14 is fixedly accommodated. As can be seen in FIG. 1, the electrically conductive paste 22 forms, in one operation, the coil structure 18 as well as the connections 24 to the terminal pads 16a, 16b, which have to be carried out in a separate step in the prior art. The application of the electrically conductive paste, which can preferably be an electrically conductive adhesive, is carried out e.g. by means of the known screen printing process. The mask defines the coil structure 18 as well as the two ends of the coil structure which establish the conductive connections 24 with the terminal pads 16a, 16b of the chip 14. After curing of the conductive paste 22, a cover layer 26 is cast analogously to the chip-card substrate 12, whereupon the chip-card substrate 12 and the cover layer 26 are laminated so as to protect the contactless chip card against external undesired influences and so as to secure the coil structure 18 in position.

Figure 2A:
FIG. 2A to 2D show a sequence of steps for producing the contactless chip card according to FIG. 1.
Figure 2B:
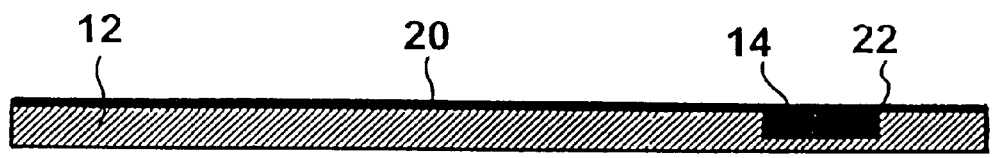
Figure 2C:
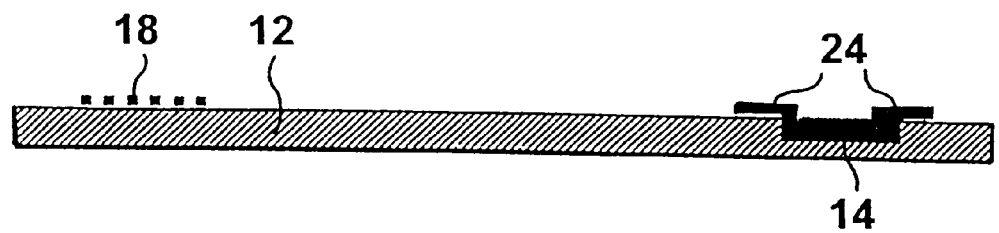
Figure 2D:
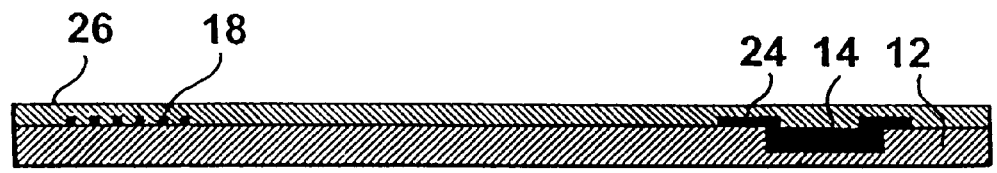

As can be seen from FIG. 2D, separate fastening of the microchip 14 or of the coil structure 18 is therefore not necessary due to the lamination of the cover layer 26 and of the chip-card substrate 12, since said microchip 14 and said coil structure 18 are fixedly and reliably held at their correct positions relative to one another by the connections 24 as well as by the cover layer 26.

Due to the fact that the chip 14 is cast into the chip-card substrate 12, as can be seen in FIGS. 2A to 2D, it is guaranteed that the chip is arranged essentially without any gap towards the chip-card substrate. In addition, this is a simple way of guaranteeing that a main surface of the chip, which is provided with the terminal pads, is arranged such that the surface thereof is substantially flush with the surface of the chip-card substrate, whereby the screen printing process can be used for applying the conductive paste so as to produce in one step the coil structure as well as the connection between said coil structure and the chip in a reliable manner.

If, notwithstanding the above, the main surfaces of the chip 14 and of the chip-card substrate 12 are not exactly flush with one another due to deviations caused by the production process, certain tolerances exist in this respect, since the height of the conductive paste 22 can compensate errors of alignment within certain limits for reliably establishing the connections 24 with the terminal pads 16a, 16b of the chip 14.

Although the drawings of FIGS. 1 and 2A to 2D do not show any gap between the chip 14 and the chip-card substrate 12, this exact production precision for casting the chip-card substrate material is not absolutely necessary either, since with regard to the function of the contactless chip card it is of no importance when a small amount of the conductive paste 22 penetrates into an existing gap as long as the individual turns of the coil structure 18 are not short-circuited and as long as possible high-frequency effects caused by parasitic stray capacitances of the coil structure do not make the coil antenna ineffective.

What is claimed is:

1. A method of producing a contactless chip card (10), comprising the following steps:

holding a chip (14), which is provided with terminal pads (16a, 16b) on a surface thereof, in a mould defining a chip-card substrate (12), in such a way that the chip surface provided with said terminal pads is located substantially in the same plane as a chip-card substrate surface defined by the mould;

introducing a chip-card substrate material into the mould; and applying a coil structure (18) by screen-printing a conductive paste onto the chip-card substrate (12) in such a way that the coil structure (18) extends up to the terminal pads (16a, 16b) on the chip.

2. A method according to claim 1, wherein, after the application of the coil structure on the chip-card substrate (12), an insulating cover layer (26) is applied on top of said chip-card substrate in such a way that the coil structure (18) and the chip (14) are arranged between the chip-card substrate (12) and the cover layer (26).

* * * * *